United States Patent [19]

Gavilondo et al.

[11] Patent Number: 4,900,956
[45] Date of Patent: Feb. 13, 1990

[54] CLOSED CHANNEL AXIAL VENT FOR RADIALLY VENTILATED GENERATOR ROTOR

[75] Inventors: Carlos A. Gavilondo, Winter Park; Aleksandar Prole, Winter Springs, both of Fla.

[73] Assignee: Westinghouse Electric Corp., Pittsburgh, Pa.

[21] Appl. No.: 270,864

[22] Filed: Nov. 14, 1988

[51] Int. Cl.⁴ .............................................. H02K 1/32
[52] U.S. Cl. ................... 310/61; 310/60 A; 310/201; 310/215; 310/261
[58] Field of Search ............... 310/215, 214, 213, 45, 310/52, 55, 58, 59, 60 A, 64, 65, 201, 208, 194, 261, 61, 270, 60 R

[56] References Cited

U.S. PATENT DOCUMENTS

| | | | |
|---|---|---|---|
| 3,119,033 | 1/1964 | Horsley et al. | 310/64 |
| 3,413,499 | 11/1968 | Barton et al. | 310/58 |
| 3,748,506 | 7/1973 | Lang | 310/53 |
| 3,821,568 | 6/1974 | Gillet | 310/54 |
| 3,997,803 | 12/1976 | Mishra | 310/59 |
| 4,016,442 | 4/1977 | Eggemann et al. | 310/59 |
| 4,203,044 | 5/1980 | Linscott | 310/61 |
| 4,251,745 | 2/1981 | Germann | 310/52 |
| 4,383,191 | 5/1983 | Mizuyama et al. | 310/59 |
| 4,508,985 | 4/1985 | Pavlik et al. | 310/55 |
| 4,547,688 | 10/1985 | Hammer et al. | 310/59 |
| 4,634,910 | 1/1987 | Schöllhorn | 310/214 |

FOREIGN PATENT DOCUMENTS 0055736  6/1919  Sweden ............................. 310/64

*Primary Examiner*—R. Skudy

[57] ABSTRACT

An axial vent channel (30) for installation in a generator rotor winding slot, the channel (30) being in the form of an elongate, closed tube of polygonal cross section enclosing a longitudinal passage (32), the tube being formed to have a closed bottom wall and an opposed, substantially closed, top wall provided with a plurality of radial vent slits (36) spaced apart along the longitudinal passage (32), the channel (30) being configured to be installed in the rotor winding slot with the passage (32) extending parallel to the axis of the rotor, the bottom wall facing toward the axis of the rotor and the top wall facing away from the axis of the rotor.

11 Claims, 1 Drawing Sheet

CLOSED CHANNEL AXIAL VENT FOR RADIALLY VENTILATED GENERATOR ROTOR

BACKGROUND OF THE INVENTION

The present invention relates to ventilated rotors for generators, and is particularly concerned with structures for creating ventilation paths in such rotors.

Generator rotors are provided with windings to which a current is applied in order to create the magnetic flux required in order to generate output power. Typically, the windings are constituted by copper straps which are installed in slots formed in the rotor circumference, or winding face, the straps being connected together at their ends to form the windings. The flow of current through the windings results in the generation of heat which must be dissipated. Efficient heat dissipation enables higher current levels to be carried by windings in a generator having a given size.

According to one known technique for effecting such heat dissipation, cooling gas is caused to flow axially beneath each stack of conductive straps, and is then directed radially outwardly via spaced radial vents formed in the straps, as well as in insulators disposed between the straps. This is known as radial path rotor ventilation.

For a given current level, the rate at which heat evolves decreases as the effective current flow cross section of the copper conductors increases. Conversely, the larger the effective cross sections of the various vent passages, the better the cooling. Thus, for a given rotor slot cross-sectional area, the desirability of installing copper conductors having a large cross section in the direction of current flow conflicts with the desirability of providing as large a cross section as possible for the flow of cooling gas.

Various arrangements known in the art seek to resolve these conflicting considerations with varying degrees of success. One known arrangement is illustrated in FIG. 1 and includes a slot cell, or liner, 2 of insulating material which is configured to fit snugly in an axially extending rotor slot with a bottom portion 3 which rests against the slot bottom, and which extends axially along the entire length of that slot. Within cell 2 there is disposed a channel 4 of copper which is formed by bending a flat strip into approximately a C-shape, so that the upper surface of channel 4 is open along its entire length. Upon channel 4 there is disposed a stack composed of copper straps 6 and 8, with an insulating strip 10 being interposed between successive copper straps. In practice, a larger number of copper straps 8 and insulating strips 10 than illustrated will be provided in each rotor slot.

Copper strap 6 rests directly on channel 4 so that channel 4 and strap 6 act together as a single conductor. Straps 6 and 8 and strip 10 are provided with mutually aligned radial vent passages 12 for radially conducting cooling gas which initially flows axially along the passage defined by channel 4.

The structure shown in FIG. 1 requires that strap 6 be relatively thick to assure that it does not buckle during rotor assembly. Since each conductive strap 6, 8 will carry the same current level, it is desirable for all of the conductive straps to have the same current flow cross section and heat generation will be minimized by making those cross sections as large as possible. However, for a rotor slot having a given size, the larger the conductive straps, the smaller the gas flow passage provided by channel 4. Therefore, in order for the passage provided by channel 4 to have the necessary cross-sectional area, strap 8, as well as the straps thereabove, must be made thinner than strap 6. As a result, the rotor will operate at higher temperatures and will require greater input power.

A second prior art approach is illustrated in FIG. 2. Here, each rotor slot has a channel 14 milled in its bottom to provide an axial flow path for cooling gas. Upon channel 14 there is placed a relatively thick insulating creep spacer 16 which supports slot cell 18, of insulating material, and a stack composed of copper straps 20 and interposed insulating strips 22. Here again, the number of straps 20 and strips 22 provided in practice will be greater than that illustrated in FIG. 2. All straps 20 and strips 22 are provided with mutually aligned vent passages 24 for radially conducting cooling gas which initially flows axially through channel 14.

The structure illustrated in FIG. 2 includes a considerable amount of insulation, thereby reducing the space available for conductive straps. Moreover, there is a considerable danger, with this structure, that the high velocity cooling gas traveling axially through channel 14 will cause flaking of material from spacer 16, resulting in the danger of blockage of the radial vents, which will cause thermal imbalances. Moreover, in order to create the required radial vent passages, holes must be punched in the bottom of slot cell 18, and this compromises the structural integrity of that component.

SUMMARY OF THE INVENTION

It is an object of the present invention to eliminate, or at least minimize, the drawbacks of known generator rotor ventilating systems.

Another object of the invention is to achieve an improved compromise between winding conductor cross-sectional area and cooling gas flow area.

A more specific object of the invention is to provide a novel axial vent channel component which makes available, in a rotor slot of given size, a relatively large area for installation of conductive straps, while providing an axial vent passage having a substantial cross-sectional area.

The above and other objects are achieved, according to the present invention, by an axial vent channel for installation in a generator rotor winding slot, the channel being in the form of an elongate, closed tube of polygonal cross section enclosing a longitudinal passage, the tube being formed to have a closed bottom wall and an opposed, substantially closed, top wall provided with a plurality of radial vent slots spaced apart along the longitudinal passage, the channel being configured to be installed in the rotor winding slot with the passage extending parallel to the axis of the rotor, the bottom wall facing toward the axis of the rotor and the top wall facing away from the axis of the rotor.

BRIEF DESCRIPTION OF THE DRAWINGS

FIGS. 1 and 2 have already been described in detail above.

DESCRIPTION OF THE PREFERRED EMBODIMENTS

Figure 1:
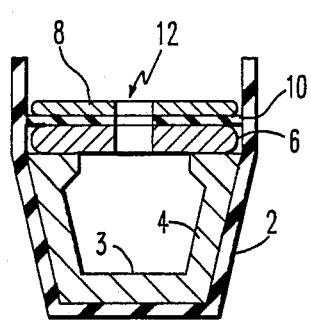
FIG. 1 is a cross-sectional view of one known arrangement of components in a slot of a radial path
Figure 2:
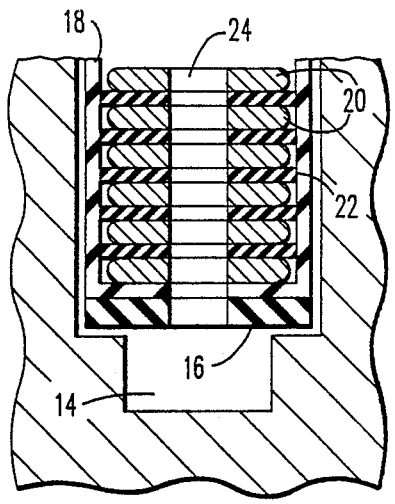
FIG. 2 is a cross-sectional view of a second known arrangement of this type.
Figure 3:
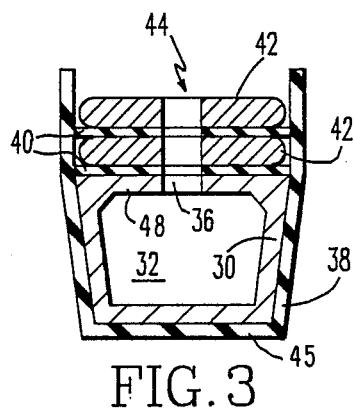
FIG. 3 is a cross-sectional view of one preferred embodiment of the present invention.
Figure 4:
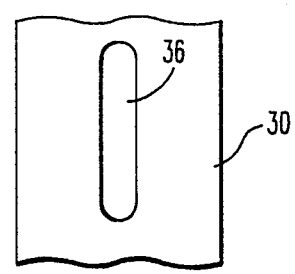
FIG. 4 is a detail plan view of the channel shown in FIG. 3.

FIG. 3 shows a preferred embodiment of the invention, which is constituted by an axial vent channel 30 having a generally trapezoidal cross-section which encloses an axial vent passage 32 and is essentially completely closed around its periphery, except for a succession of radial vent slits 36 spaced apart along the length of channel 30, the length being perpendicular to the plane of FIG. 3. One such slit 36 is shown in FIG. 4.

Channel 30 is inserted in a slot cell 38 of insulating material and is surmounted by a stack composed of insulating strips 40 alternating with copper rotor winding straps 42. Here again, the number of insulating strips 40 and winding straps 42 employed in practice will be greater than that illustrated.

Insulating strips 40 and copper straps 42 are provided with slits aligned with slit 36 to form radial vent passages 44.

The channel illustrated in FIG. 3, because of its essentially closed structure, allows the amount of electrically inactive insulating material provided in the rotor slot to be minimized while providing secure mechanical support for the stack composed of insulating strips 40 and copper straps 42. The support provided by channel 30 allows all of the copper straps 42 to be given the same current flow cross section.

Moreover, substantially closed channel 30 eliminates the possibility that high velocity cooling gas flowing through passage 32 can cause flaking of insulating material.

Further, this channel structure eliminates the need to punch holes in the bottom 45 of slot cell 38.

Channel 30 can be readily constructed by extrusion of a single copper billet, followed by cold working to retain desired mechanical properties. Radial slits 36 can be subsequently be punched in the channel by means of mating male/female dies.

According to a further feature of the invention, slits 36 are given the elongated shape shown in FIG. 4, whereby their dimension along the length of channel 30 is substantially greater than in the direction transverse thereto. Since the slits formed in copper straps 42 will have the same size and configuration as slits 36, the result is that the presence of the slits in straps 42 will produce only a minimal reduction in their current flow cross section, while the length of slit 36 in the axial direction of channel 30 enables the resulting radial cooling gas vent paths to be given a sufficiently large cross section. By way of example, a channel 30 for installation in a rotor having an axial length of the order of 91 cm (36"), channel 30 having the same length, can be provided with slits 36 at a spacing, along the rotor axis, of the order of 3.53 cm (1.39"), and each slit 36 can have a length, in the axial direction of the rotor, of the order of 2.16 cm (0.85") and a width of the order of 0.25 cm (0.1").

Figure 5:
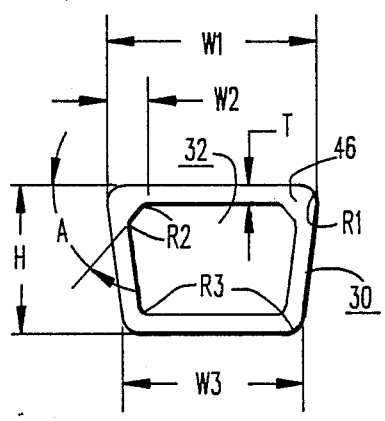
FIG. 5 is a cross-sectional view, to a larger scale, of the channel shown in FIG. 3.

An exemplary embodiment of channel 30 having a generally trapezoidal cross-section is shown in FIG. 5, and could have the following dimensions, which are given by way of non-limiting example, for the case where channel 30 is to be installed in a rotor having an axial length of 91 cm, channel 30 having the same length:

$H = 2.92$ cm $\pm .0127$ ($1.150'' \pm 0.005$)
$W_1 = 2.637$ cm $\pm .0127$ ($1.038'' \pm 0.005$)
$W_2 = 0.635$ cm ($0.25''$)
$W_3 = 1.81$ cm $\pm 0.0127$ ($0.712'' \pm .005$)
$A = 60°$
$R_1 = 0.163$ cm
$R_2 = 0.15$ cm ($0.06'' \pm 0.016$)
$R_3 = 0.27$ cm $\pm 0.041$ ($0.106'' \pm 0.016$)
$T = 0.229$ cm $\pm 0.0127$ ($0.090'' \pm 0.005$)

Cross-sectional area of passage $32 = 4.12$ cm$^2$ ($0.639$ in$^2$)

Cross-sectional area of metal forming channel $30 = 2.34$ cm$^2$ ($0.362$ in$^2$)

As shown in FIG. 5, the upper extremities of the side walls of channel 30 are provided with thickened portions 46, delineated by width dimension $W_2$ and angle A, which assure that the channel top wall 48 will provide the required support for the stack composed of insulating strips 40 and winding straps 42.

Figure 6:
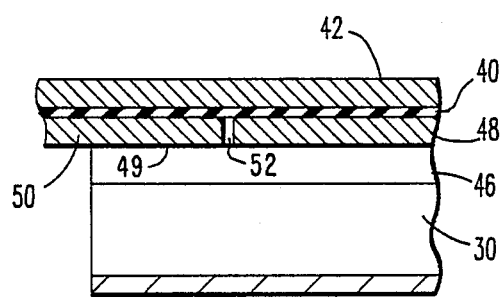
FIG. 6 is a longitudinal cross-sectional view of one end of a channel according to the invention.

In further accordance with the invention, the axial vent channel can serve as a rotor winding conductor, thereby maximizing the utilization of each rotor slot. For this purpose, each channel end can be dimensioned to project a short distance beyond the axial end of the associated rotor body and, as shown in FIG. 6 for one channel end, the top wall 48 of channel 30 can be cut away, for example, down to the level of thickened portions 46, to provide a seat 49 for the end of a copper strap 50 which forms a part of a winding end turn. Strap 50 is conductively secured to top wall 48 and thickened portions 46, for example by brazed joints 52. According to an exemplary embodiment of the invention, the length of strap 50 which contacts thickened portions 46 may be of the order of 5 cm.

The novel peripherally closed channel according to the present invention provides an axial vent passage for a radial path rotor which, for a given rotor slot size, provides maximum space for the copper winding straps, thereby allowing the current flow cross-sectional area of the straps to be maximized and reducing the required exciter power. Moreover, the novel channel according to the present invention reduces the amount of insulation required by known arrangements, while eliminating the need for punching holes in the slot cell.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An axial vent channel for installation in a generator rotor winding slot formed in the circumference of a rotor having a longitudinal axis, said channel being in the form of an elongate, closed tube of polygonal cross section enclosing a longitudinal passage, said tube being formed to have a closed bottom wall and an opposed, substantially closed, top wall provided with a plurality of radial vent slits spaced apart along said longitudinal passage, said channel being configured to be installed in the rotor winding slot with said passage extending parallel to the axis of the rotor, said bottom wall facing toward the axis of the rotor and said top wall facing away from the axis of the rotor.

2. A channel as defined in claim 1 wherein said tube has a generally trapezoidal cross section, with said bottom wall defining the smaller base and said top wall defining the larger base of the trapezoid.

3. A channel as defined in claim 2 wherein said tube is further composed of opposed side walls extending between said top wall and said bottom wall and each of said side walls is provided with a thickened portion in the region adjacent said top wall to serve as support for said top wall.

4. A channel as defined in claim 1 wherein each of said radial vent slits has a dimension in the direction of said longitudinal passage which is substantially greater than the dimension thereof transverse to said longitudinal passage.

5. A channel as defined in claim 4 wherein each said radial vent slit has a dimension of the order of 2.16 cm in the direction of said longitudinal passage and a dimension of the order of 0.25 cm in the direction transverse to said longitudinal passage.

6. In a generator rotor, having a winding slot, which slot has a bottom, the combination comprising:
a slot cell disposed in the winding slot and having a portion resting against the slot bottom;
an axial vent channel in the form of an elongate, closed tube of polygonal cross section enclosing a longitudinal passage, said tube being formed to have a closed bottom wall and an opposed, substantially closed, top wall provided with a plurality of radial vent slits spaced apart along said longitudinal passage, said channel being disposed in said slot cell, with said bottom wall of said vent channel resting against the portion of said slot cell which rests against the slot bottom; and
a stack composed of conductive straps alternating with insulating strips disposed in said slot cell and resting against said top wall of said channel, with each of said conductive straps and insulating strips being provided with a plurality of radial vent slits aligned with said radial vent slits of said channel.

7. The combination defined in claim 6 wherein said tube has a generally trapezoidal cross section, with said bottom wall defining the smaller base and said top wall defining the larger base of the trapezoid.

8. The combination defined in claim 7 wherein said tube is further composed of opposed side walls extending between said top wall and said bottom wall and each of said side walls is provided with a thickened portion in the region adjacent said top wall to serve as support for said top wall.

9. The combination defined in claim 6 wherein each of said radial vent slits has a dimension in the direction of said longitudinal passage which is substantially greater than the dimension thereof transverse to said longitudinal passage.

10. The combination defined in claim 9 wherein each said radial vent slit has a dimension of the order of 2.16 cm in the direction of said longitudinal passage and a dimension of the order of 0.25 cm in the direction transverse to said longitudinal passage.

11. The combination defined in claim 6 wherein said conductive straps and said channel constitute rotor winding conductors, and further comprising conductive means connecting each end of said channel to a rotor winding end turn.

* * * * *